United States Patent [19]

Tucker et al.

[11] Patent Number: 5,547,325
[45] Date of Patent: Aug. 20, 1996

[54] NAIL PACKS MADE OF COMPOSITES HAVING HIGH COMPRESSIVE STRENGTH AND FLEXURAL MODULES

[75] Inventors: Pamela S. Tucker; Nancy Showers, both of Austin, Tex.

[73] Assignee: Utility Composites, Inc., Austin, Tex.

[21] Appl. No.: 198,845

[22] Filed: Feb. 18, 1994

[51] Int. Cl.[6] .......................... F16B 15/08; B65D 85/24; B21G 3/00
[52] U.S. Cl. .......................... 411/442; 411/908; 206/345; 470/34
[58] Field of Search .................................. 411/442, 443, 411/444, 446, 908; 206/343, 345; 470/34

[56] References Cited

U.S. PATENT DOCUMENTS

| | | | |
|---|---|---|---|
| 2,510,693 | 6/1950 | Green . | |
| 3,112,667 | 12/1963 | Brentlinger . | |
| 3,165,968 | 1/1965 | Anstett . | |
| 3,225,917 | 12/1965 | Couch | 206/56 |
| 3,252,569 | 5/1966 | Matthews | 206/56 |
| 3,348,669 | 10/1967 | Powers | 206/56 |
| 3,492,907 | 2/1970 | Hauck . | |
| 3,813,985 | 6/1974 | Perkins . | |
| 3,915,299 | 10/1975 | Miyaoku | 206/345 |
| 4,206,264 | 6/1980 | Kurr | 428/458 |
| 4,456,123 | 6/1984 | Russell | 206/343 |
| 4,664,733 | 5/1987 | Massago | 156/212 |
| 4,826,381 | 5/1989 | Kiriyama | 411/443 |
| 4,863,330 | 9/1989 | Olez et al. | 411/908 X |
| 4,903,831 | 2/1990 | Francis | 206/347 |
| 4,909,690 | 3/1990 | Gapp et al. | 411/908 X |
| 4,971,503 | 11/1990 | Barnell et al. | 411/443 |
| 5,098,940 | 3/1992 | Brooks | 524/227 |
| 5,149,237 | 9/1992 | Gabriel et al. | 411/446 |
| 5,153,250 | 10/1992 | Sinclair | 524/230 |

OTHER PUBLICATIONS

"Amodel® Polyphthalamide," Amoco brochure, p. 14, date unknown.
Letter, 3 pages, Jun. 1, 1987, and brouchure "Kowa T Nail" from Marukyo U.S.A., Inc., six pages, printed in Japan, date unknown.
"Resins and Compounds", 10 pages, *Modern Plastics*, Mid–Oct. 1991.
"Properties of Generic Materials," *International Plastics Selector*, A30–A33, A56–A59, 1989.

*Primary Examiner*—Neill R. Wilson
*Attorney, Agent, or Firm*—Arnold, White & Durkee

[57] ABSTRACT

A continuous nail pack made of ultra-high strength plastic composite materials, for example, thermoplastic or thermoset materials for use in standard nailing machines. The individual nails have sufficient compressive strength and a flexural modulus such that the nail may be used for nailing into commodity woods for construction, furniture making, or for building boats. Further, this nail pack is non-corrodible and provides plastic nails having a length/diameter ratio of a working nail heretofore unavailable.

42 Claims, 4 Drawing Sheets

NAIL PACKS MADE OF COMPOSITES HAVING HIGH COMPRESSIVE STRENGTH AND FLEXURAL MODULES

BACKGROUND OF THE INVENTION

1. Field of the Invention

The present invention relates generally to the field of plastic nails. More particularly, it concerns an improved plastic nail pack for use in an automatic nailing machine. The nail packs are made of ultra-high strength plastic composites, for example, thermoplastic or thermoset materials.

2. Description of the Related Art

The use of machine-driven fasteners is widespread in industry, particularly in construction. Applications include furniture making, cabinet making, boat manufacture, roofing, dry wall installation, deck building, fence building and interior finish out, to name but a few. A major concern affecting the lifetime, quality and appearance of such applications is corrosion of the fastener. Galvanization of metal nails is the predominant method for reducing corrosion. Other methods include using aluminum or stainless steel or plastic-coated nails. All of these methods add considerable cost to the finished fastener, and do not completely prevent fastener corrosion.

Attempts have been made to produce nail fasteners from materials that do not significantly corrode, namely plastics. U.S. Pat. No. 2,510,693 to Green, Jun. 6, 1950 relates to fasteners made from a thermoplastic material having reinforcing fibers therein. U.S. Pat. No. 3,165,968 to Anstett, Jan. 19, 1965 describes a synthetic plastic nailing strip of, for example, a polyamide resin. U.S. Pat. No. 3,112,667 to Brentlinger, Dec. 3, 1963 relates to nails for use in dry wall construction, the nails having a recessed head and means for preventing flattening of the head when the nail is driven into a dry wall panel. U.S. Pat. No. 3,225,917 to Couch, Dec. 28, 1965 relates to a package of drive type fasteners for use in automatic nailing machines. U.S. Pat. No. 3,252,569 to Matthews, May 24, 1966 describes a plastic coated laminated nail having a reinforcing metallic wire core and a thermoplastic body. U.S. Pat. No. 3,348,669 to Powers, Oct. 24, 1967 describes formation of tools adapted to sever and drive individual fasteners from a stick supply of fasteners.

U.S. Pat. No. 3,492,907 to Hauck, Feb. 3, 1970 relates to a molded plastic tack strip adapted for use in a tack gun, the strip having a plurality of closely spaced tack shanks interconnected by severable webs. U.S. Pat. No. 3,813,985 to Perkins, Jun. 4, 1974 relates to coated fasteners, adhesive-coating compositions for fasteners, single-bevel, divergent point staples, and groups of staples united by an adhesive coating. U.S. Pat. No. 3,915,299 to Miyaoku, Oct. 28, 1975 describes a nail strip having side-to-side perforations in each nail permitting their alignment and a belt threaded through them for connection. The nail may be made of steel-reinforced plastics, such as methyl methacrylate, with waterproof, anti-moisture and anti-corrosion properties.

U.S. Pat. No. 4,456,123 to Russell, Jun. 26, 1984 relates to a method for attaching price tags to garments and for other joining applications using plastic fasteners dispensed through hollow, slotted needles. U.S. Pat. No. 4,664,733 to Masago, May 12, 1987 describes cohered fasteners, in particular, cohered nails, secured together in contiguous relation wherein separation of a fastener to be driven is facilitated. A group of wires is coated with an adhesive of thermoplastic resin and a second coating of nitrocellulose resin to form a strip for shaping into desired fasteners.

U.S. Pat. No. 4,826,381 to Kiriyama, May 2, 1989, incorporated by reference herein, relates to a continuous nail for automatic nailing machines. Each nail is injection molded with a thermoplastic resin e.g., polyamide resin, mixed with reinforcing materials, such as fine glass fiber, carbon fiber, etc. to improve the strength of the nail. The surface of the nail will be melted by frictional heat when it is driven for nailing. Kowa T Nail, a manufacture's brochure mentioned in patent '381, relates to a plastic nail, a plastic staple and a pneumatic nailer. The shape of the nail and low L/d necessitated the development of a special pneumatic tacker.

U.S. Pat. No. 4,971,503 to Barnell et al., Nov. 20, 1990 describes nail packs and clips used in automatic nailing guns. The nail package may contain plastic nails interconnected by integrally molded upper webs and lower webs. The plastic is a thermoplastic having high impact resistance and high tensile strength, such as Ultem, Nylon, A.B.S., polyester, polyphenoleneoxide and polycarbonate. U.S. Pat. No. 5,098,940 to Brooks, Mar. 24, 1992 relates to crystalline polyphthalamide component and a particulate thermotropic liquid crystalline polymer component in an amount sufficient to nucleate a melt of the polyphthalamide. The compositions are reported to be useful as injection molding compounds for production of electronic connectors, switch components, pump housings, valve components and under-the-hood automobile parts.

U.S. Pat. No. 5,153,250 to Sinclair, Oct. 6, 1992 describes compositions comprising (1) a polyphthalamide component comprising at least two recurring units selected from the group consisting of terephthalamide units, isophthalamide units and adipamide units and which, when filled with glass fibers, has a heat deflection temperature at 264 psi, according to ASTM D-648, of at least about 240° C.; (2) about 10 to about 200 parts by weight reinforcing fibers per hundred parts by weight of the polyphthalamide component and (3) at least about 0.01 to about 5 parts by weight particulate talc per hundred parts by weight of the polyphthalamide component. The cited uses are the same as for U.S. Pat. No. 5,098,940.

U.S. Pat. No. 4,206,264 to Kurr relates to a group of polyester resins for coating fasteners. U.S. Pat. No. 5,149,237 to Gabriel et al. also relates to a coating for metal fasteners. The coating is a combination of two resins, a copolymer of preferably styrene and maleic anhydride and a thermoplastic resin, preferably vinyl acetate. U.S. Pat. No. 4,903,831 to Francis relates to an automatic hailer system which employs plastic ferrules which hold nails to form a strip.

The design of a nail for impact penetration is analogous to that of structural columns (*Mechanics of Materials*, 3rd ed., by Higdon et al., John Wiley & Sons, New York, 1976; and *Design of Wood Structures*, 3rd ed., by D. E. Breyer, McGraw-Hill, Inc., New York, 1993), with proper adjustment for the rate of load being applied, and assuming uniform stress in the nails during penetration. Adjustment of the rate of loading is accomplished by multiplication of a constant for impact loads. It serves to increase the allowable column stress compared to a load applied over a long period of time. The effect is the same for all plastic material types, therefore, is not applied in the analysis presented herein.

In ideal column design, two types of columns are considered: short and long. The former implies that the column will not buckle and its strength is related to the compression strength of the material. The latter presumes column instability, called buckling, as the only failure mechanism. In most situations, design of real columns, or nails, must consider the possibility of buckling (midsection of column) and crushing (ends of column). Actual column/nail behavior is defined by the interaction of the buckling and crushing modes of failure.

Whether the column is short or long is determined by the slenderness ratio which is the primary measure of buckling. The slenderness ratio is defined as $$\text{slenderness ratio} = \frac{\text{effective unbraced length of column}}{\text{least radius of gyration}} = \frac{L}{d}$$

Pure crushing can be considered the mechanism of failure for slenderness ratios less than about 2 or 3, and is measured by the compressive strength of the material. For slenderness ratios above about 130, buckling can be considered the single mode of failure. The maximum stress for pure buckling is defined by the Euler critical buckling stress for long slender members:

$$F_b = \frac{\pi^2 E}{(L/d)^2}$$

$F_b$ = Euler critical buckling stress
E = flexural modulus
L = length
d = diameter (effective diameter)

To determine the actual maximum load the member can withstand without failure of either type, slenderness ratios between 3 and 130 should be analyzed using an empirical column formula to account for both buckling and crushing of the column member. Numerous empirical formulas exist for describing the maximum load for slenderness ratios between about 3 and 130. FIG. 3 depicts a maximum column load as a function of slenderness ratio ($\sigma_{max}$ is the compressive strength and E is the flexural modulus). The regions of pure crushing, pure buckling and combinations of crushing and buckling are shown. For simplicity, the materials of the examples presented herein are analyzed as ideal columns. In this case, the lines defining pure crushing and pure buckling define the maximum stress the member can withstand. Any of the empirical formulas could be chosen and applied to materials for detailed, individual analysis, but is unnecessary for comparisons between materials. It would have the same effect as multiplying all numbers by a constant; the relative values are still maintained.

Current plastic nails are not sufficiently strong to penetrate commodity woods such as white, yellow and treated pine, chip board or oak, and to be formed into a standard shape to fit existing nailers. In addition, current plastic nails are limited to a length/diameter ratio of less than about 16 with the overall length not generally exceeding one inch.

SUMMARY OF THE INVENTION

The present invention provides a plastic nail pack mountable in an automatic nailer comprising plastic composite nails having an ultra-high strength heretofore unavailable. The plastic composite materials of the nails of the present invention have a compressive strength greater than about 20,000 psi and a flexural modulus greater than about $1.2 \times 10^6$ psi.

Compressive strength is the ability of a material to resist a force that tends to crush it. Its value is given by the crushing or compressive load at the failure of a specimen divided by the original area of the specimen (ASTM Test D695). Compressive strength of nails of the present invention, nails made from other materials and commercially available Kotowa nails is represented in FIG. 4 by the horizontal portion of the graph. The maximum stress to fail for L/d ratios less than about 20–24 is described as compressive strength and is independent of the L/d ratio. The mode of failure for nails of these L/d ratios is primarily that of crushing.

Flexural modulus is the ratio, within the elastic limits, of the applied stress on the test specimen to the corresponding strain in the outermost fibers of the specimen. The applied stress is during a bending or flexing cycle, where the specimen is supported at two points with the stress being applied midway between them (ASTM Test D790). Flexural modulus is independent of L/d ratio, and is used to describe the strength during penetration of a nail at L/d ratios where bending or buckling is the primary mode of failure. The Euler bending or buckling stress is a function of L/d ratio and flexural modulus and is calculated as previously described using these parameters. The Euler bending stress is represented by the curved lines of FIG. 4 and is the maximum stress to fail at higher L/d ratios where bending or buckling is the primary mode of failure.

A nail pack in accordance with the invention comprises a plurality of nails of the invention joined in a strip, belt, clip or the like for sequential entry into an automatic nailer and subsequent penetration of materials such as wood, plaster board and the like. It is especially contemplated that the nail packs of the invention will be arranged side-by-side and fed one-by-one into an automatic nailer.

The slenderness ratio, L/d, is the length of the nail divided by the diameter ($\approx$least radius of gyration). As used herein, diameter is effective diameter and may describe the diameter of a nail other than a round nail, for example, a square nail.

A preferred plastic composite is an ultra-high strength composite thermoplastic material or a thermoset material. A thermoplastic material is a material that undergoes no permanent change on heating, it flows when heated and may be reformed into a new shape. Exemplary ultra-high strength composite thermoplastic materials of the present invention are fiber-filled polyphthalamide (PPA), polyphenylene sulfide, polyetherimide, and polyamide-imide. The polyphthalamide component of fiber-filled polyphthalamide comprises terephthalamide, isophthalamide and adipamide units. The fiber component of PPA comprises from about 10% to 66% by weight of the PPA component. A most preferred composite is a glass reinforced polyphthalamide having about 33 or about 45% glass.

A thermoset material is a material capable of a high degree of crosslinking. Generally it is molded in a partially polymerized state so it flows when heated. During the molding process, further polymerization occurs and the plastic becomes highly crosslinked and no longer flows, it cannot be reformed into a new shape. Exemplary ultra-high strength composite thermoset materials of the present invention are reinforced phenolic compounds, urea or melamine formaldehyde, furan resin, polyester, epoxy, polyurethane, polyisocyanurate, polyimide or polybenzimidazole.

A preferred embodiment is wherein each nail has a compression strength greater than about 25,000 psi and a flexural modulus greater than about $1.6 \times 10^6$ psi and a more preferred embodiment is wherein each nail has a compression strength greater than about 30,000 psi and a flexural modulus greater than about $1.9 \times 10^6$ psi.

A particular embodiment of the present invention includes a plastic nail pack mountable in an automatic nailer, comprising ultra-high strength fiber-filled polyphthalamide nails, each nail having a compression strength greater than about 20,000 psi and a flexural modulus greater than about $1.2 \times 10^6$ psi. Further, polyphenylene sulfide nails having an L/d ratio from about 24 to about 36 having a compression strength greater than about 20,000 psi and a flexural modulus greater than about $1.2 \times 10^6$ psi are an aspect of the present invention.

Nails of the present invention are driveable through a commodity wood without deformation or breakage by the automatic nailer. The commodity wood may be pine, chip board, oak, maple, cedar, redwood or cherry. A preferred nail size has a diameter of about $1/16$ inch and a length greater than 1 inch.

Another embodiment of the present invention is the nail pack described above made by a process comprising the steps of obtaining an ultra-high strength plastic composite, and molding the plastic composite into a nail pack.

A method of making the above described plastic nail is a further aspect of the present invention. The method comprises the steps of obtaining an ultra-high strength plastic composite, and molding the plastic composite into a nail pack. The plastic composite has a compression strength greater than about 20,000 psi and a flexural modulus greater than about $1.2 \times 10^6$ psi.

The present invention further provides for a plastic composite nail having a compression strength greater than about 20,000 psi and a flexural modulus greater than about $1.2 \times 10^6$ psi. The plastic composite may be an ultra-high strength composite thermoplastic, for example, a fiber-filled polyphthalamide or may be a thermoset material.

A further embodiment of the present invention is a method of attaching a nail penetrable construction material. The method comprises the steps of obtaining a nail penetrable construction material, mounting a nail pack in an automatic nailer and driving the nails through the material to be attached. The nail pack comprises ultra-high strength plastic composite nails wherein each nail has a compression strength greater than about 20,000 psi and a flexural modulus greater than about $1.2 \times 10^6$ psi. The nail penetrable construction material may be a commodity wood or plaster board.

Plastic nails of the present invention are preferably used for non-structural uses such as furniture making, cabinet making, boat manufacture, roofing, drywall installation, deck building, fence building, interior finish out, lumber tagging, upholstery and tagging trees. The are sufficiently strong to penetrate commodity woods such as white, yellow and treated pine, chip board, oak, maple, cedar, redwood or cherry. It is possible to saw, sand, plane and drill through these nails without damaging the tool being used.

Further advantages of the nails of the present invention include: i) use in combustible/explosive environments where spark resistance is necessary, ii) in applications where the item being fastened would show evidence of tampering, since these nails cannot be pulled out, iii) use under water since the nails are non-corrodible, iv) use where the location of the nail cannot be found, v) use where rust is particularly unwanted, such as in privacy fences or decks, and vi) colorability to match or contrast the fastened surface. Tamper-evident means the nail would have to be broken to open or remove. It cannot be pulled out and replaced like a metal nail, so tampering cannot be covered up.

The surprising and unexpected results of the nails of the present invention are clearly shown in FIG. 4 where the PPA (Amodel®) nails have superior maximum stress to fail levels. Plastic nails having the remarkable strength of the nails of the present invention were previously unavailable at L/d ratios greater than about 18. The present invention provides for nails having remarkable strength at L/d ratios up to about 38.

BRIEF DESCRIPTION OF THE DRAWINGS

FIG. 1B is a cross-sectional view of the embodiment of FIG. 1A.

DETAILED DESCRIPTION OF THE PREFERRED EMBODIMENTS

Figure 4:
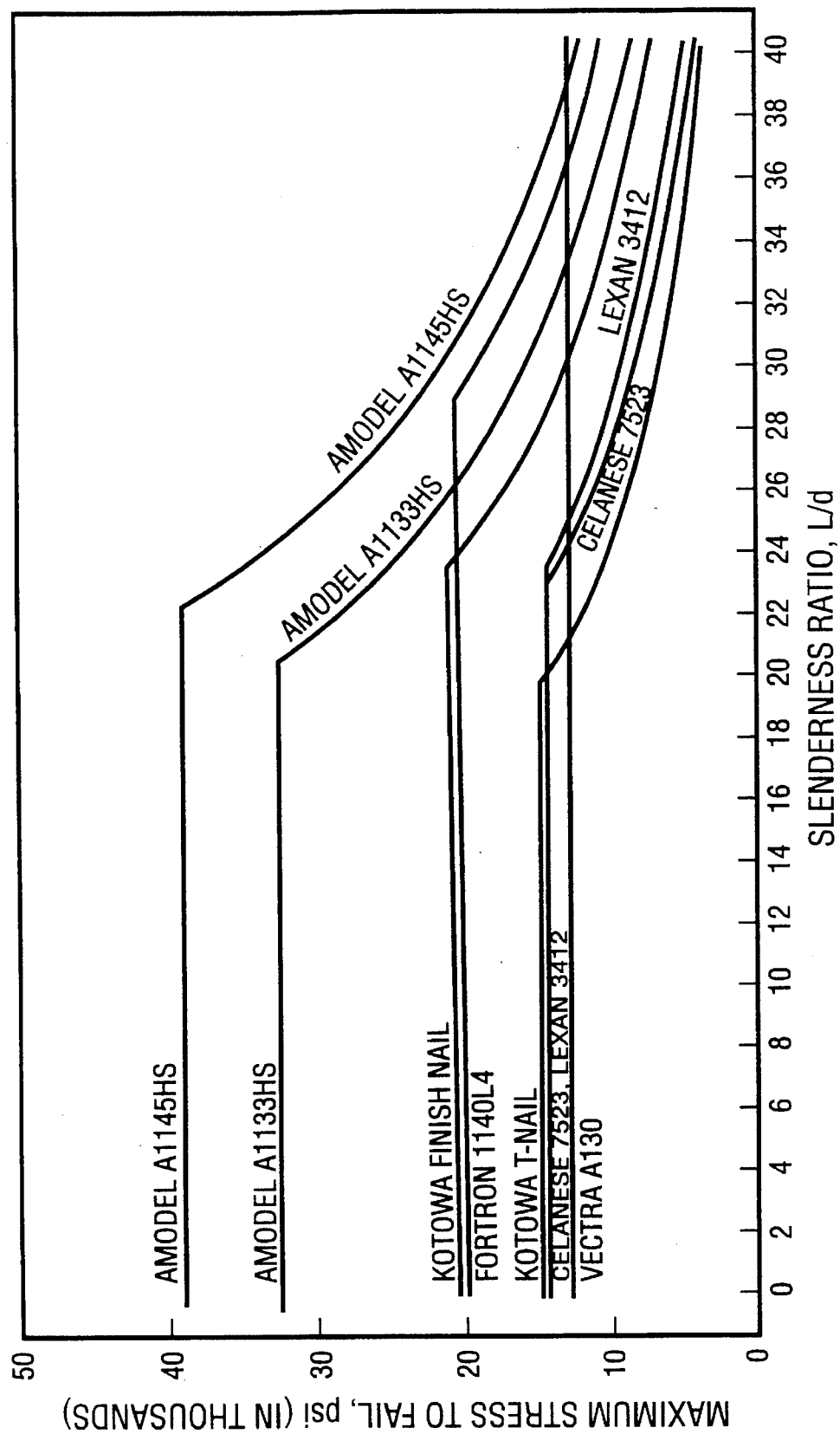
FIG. 4 shows a plot of maximum stress to fail as a function of slenderness ratio for nails of the present invention, commercially available Kotowa nails and nails made from other plastics. The horizontal portion of the graph is an expression of compressive strength, the curved part of the graph is an expression of Euler bending stress which is a function of the flexural modulus of the materials used to make the nails.

The present invention provides an improved plastic nail pack for use in an automatic nailing machine. The nail packs are made of ultra-high strength plastic composites, for example, thermoplastic or thermoset materials. Ultra-high strength as used in the present invention is defined as having a compressive strength greater than about 20,000 psi and a flexural modulus greater than about $1.2 \times 10^6$ psi. Depending on the mode of failure, maximum stress to fail is described as the compressive strength or the Euler bending stress (which is a function of the flexural modulus) of a nail. In FIG. 4, the horizontal portion of the graph represents compressive strength and the curved lines represent the Euler bending stress.

The design of these collated nail packs is based on the size and shape of collated wire nail packs. In nearly all applications where plastic replaces metal, the selection of the plastic and design of the part must be modified to account for differences in physical characteristics of plastic and metal. These differences have been taken into account in the nails of the present invention because of the high strength characteristics of the materials used.

Shown in FIGS. 1A, 1B, 2A and 2B is a nail pack 1 of connected nails to be fed into a standard automatic nailer, which dispenses single nails in sequence from the nail pack, thus separating them from the pack by striking their heads to hammer them into the desired position, usually into wood.

Figure 1A:
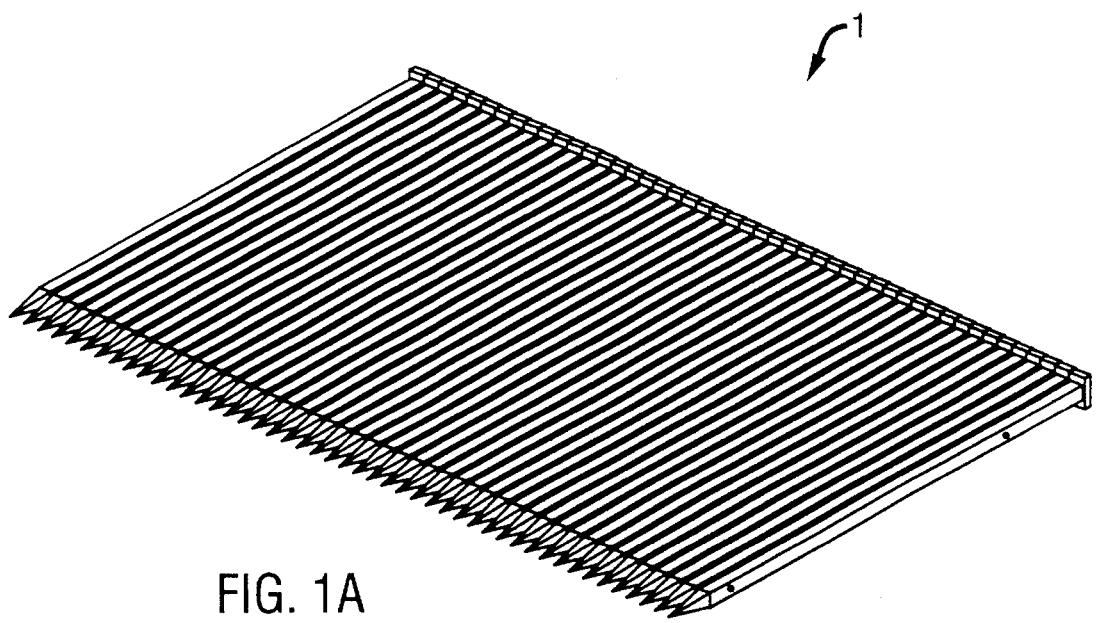
FIGS. 1A and 1B show three dimensional views of a nail pack having individual nails connected into a strip.
Figure 1B:
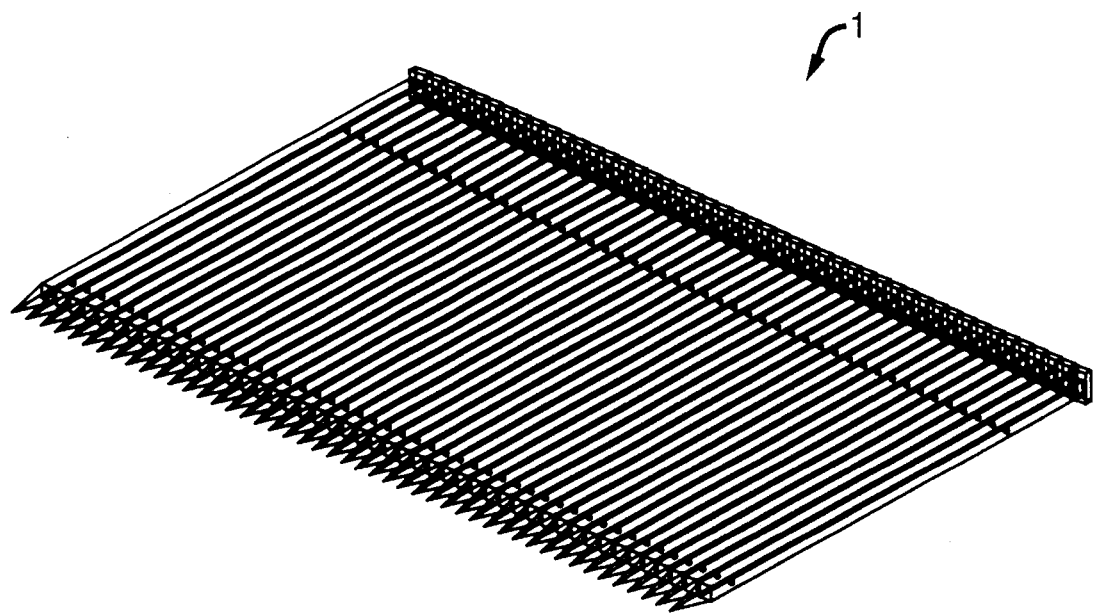
Figure 2A:
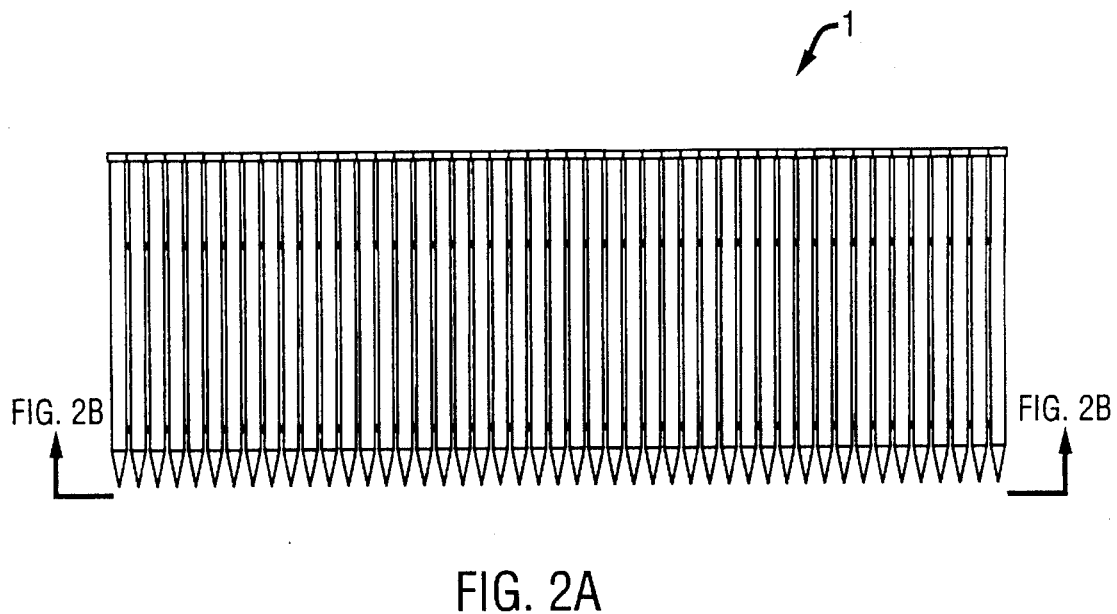
FIGS. 2A, 2B and 2C show a side view of a nail pack (2A), a bottom view of a nail pack along the line 2B . . . 2B of FIG. 2A looking in the direction of the arrows (2B), and a side view of a single nail (2C).
Figure 2B:
Figure 2C:
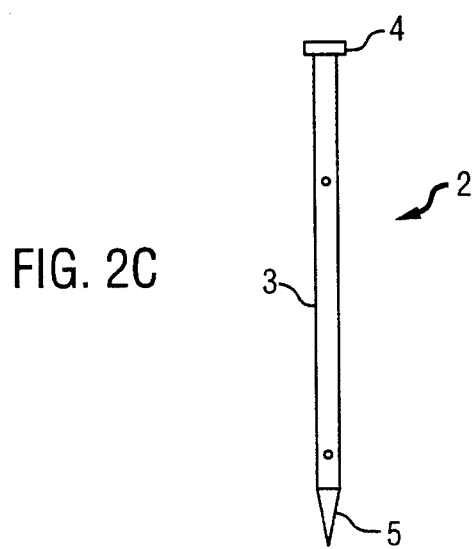
Figure 3:
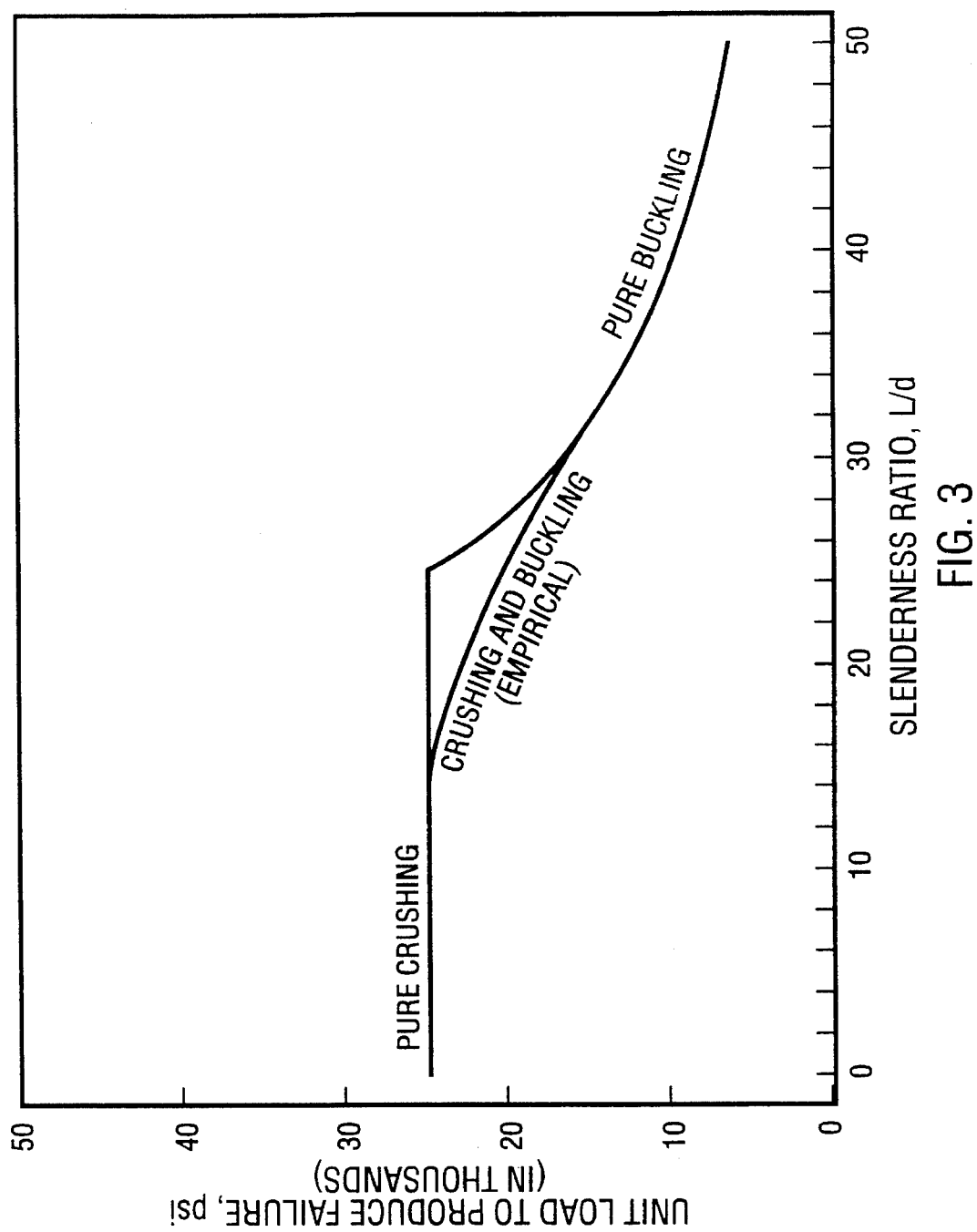
FIG. 3 shows a theoretical plot of unit load to produce failure as a function of slenderness ratio.

Shown in FIG. 2C is a single nail 2. The nail 2 has an elongated shank 3 with a head 4 and a penetrating point 5 on opposite ends thereof. The nail shown in 2C has a shaft of square cross section as shown in the bottom view of the nail pack 2B.

The nail packs fit existing industry nailers. Preferred sizes of the nails are those that fit existing tools, such as 14, 15, and 16 gauge finish nails up to about 2.5" in length, for example. Box nails, casing nails, cooler nails, and common nails are included, having L/d values lower than that of finish nails. An advantage of these nails over prior art nails is the ability to be driven into hard woods such as oak, for example.

The nail pack of the present invention is non-corrodible and provides plastic nails having a length/diameter ratio up to about 30, preferably about 10 to about 25. Two important factors in producing a working nail (a nail that penetrates wood) is the bending or flexural modulus which should be greater than about $1.2 \times 10^6$ psi and the compressive strength which should be greater than about 20,000 psi. The individual nails meeting these criteria have sufficient impact strength to be nailed into commodity woods for construction, furniture making, or boat building, for example.

A stringent requirement for a working nail is penetration into wood. Once a nail has penetrated wood, the strength of the connection can be determined by tensile and shear tests. The tensile strength of the material determines the pull-out strength. The plastic nails of the present invention bond well to wood grain and cannot be removed; but can only be broken by conventional techniques of removal. The breaking force in tension is the tensile strength of the nail material. Shear strength of the nail material will also determine the strength of the connection in shear.

Unless defined otherwise, all technical terms used herein have the same meaning as commonly understood by one of ordinary skill in the art to which this invention belongs. Although any methods and materials similar or equivalent to those described herein can be used in the practice or testing of the present invention, the preferred methods and materials are now described. Unless mentioned otherwise, the techniques employed herein are standard methodologies well known to one of ordinary skill in the art.

EXAMPLE 1

Nail Packs Made From A Thermoplastic, Fiber-Filled Polyphthalamide

This example describes a nail of the present invention made from a fiber-filled polyphthalamide. The fiber-filled polyphthalamide composition is described in U.S. Pat. No. 5,153,250, incorporated herein by reference, and comprises i) a polyphthalamide component comprising at least two recurring units selected from the group consisting of terephthalamide units, isophthalamide units and adipamide units and which, when filled with glass fibers, has a heat deflection temperature at 264 psi, according to ASTM D-648, of at least about 240° C.; ii) about 10 to about 200 parts by weight reinforcing fibers per hundred parts by weight of the polyphthalamide component and iii) at least about 0.01 to about 5 parts by weight particulate talc per hundred parts by weight of the polyphthalamide component.

Reinforcing fibers contained in the polyphthalamide composition are inorganic or organic fibers having sufficiently high modulus to provide reinforcement to the polyphthalamide component and capable of with standing temperatures employed in melt processing the composition. Suitable reinforcing fibers include glass, graphite, boron, ceramic and aramid fibers, with glass fibers being most preferred.

In PPA resins, 45% loading of chopped glass fiber produces a tensile strength of about 40,000 psi, a flexural modulus of about 2 million psi, and a heat deflection temperature (HDT) of 549° F. Optimal mechanical properties are obtained with melt temperatures ranging between 615°-650° F. and for barrel residence times of under 10 minutes. Mold temperatures of at least 275° F. are achieved for complete crystallization and optimum dimensional stability. Parts with heavy wall sections may be molded at lower mold temperatures because of the slow rate of cooling of the mass.

Polyphthalamide (PPA, Amodel® A1133HS and A1145HS, Amoco Performance Products, Inc., Ridgefield, Conn. 06877) was dried overnight at 140° F. in a vacuum oven, and fed into a reciprocating screw injection molder at barrel temperatures above the melt of the composition (580°–630° F.). The composition was plasticated and injected into a hot cavity (about 275°–300° F.) for optimum part properties. Cycle times ranged from about 20 seconds to about 45 seconds. Injection molding machines used were Arburg®, BOY®, and Van Dorn®.

Nails made from this polyphthalamide composition have a bending or flexural modulus of $1.36 \times 10^6$ psi and $1.92 \times 10^6$ psi, notched Izod impact strength of 1.5 and 2.1 and compressive strength of 32,000 and 35,000 psi. These values are measured from two different grades of polyphthalamide used for each L/d ratio. Nails produced had an L/d ratio of 22 and 25. Results of maximum stress to fail tests are presented in FIG. 4.

A nail pack made from the fiber-filled polyphthalamide composition of this example was inserted into the following standard nailers: Spotnail HLB1516P and Spotnail HLB1516, Spotnail, Inc., Rolling Meadows, Ill. 60008; Paslode 3250-F16, ITW Paslode, Lincolnshire, Ill. 60069-9950; Hitachi NT65A, Hitachi Power Tools, Norcross, Ga. 30093; Duo-Fast HFN-880, Duo-Fast, Franklin Park, Ill. 60131; and Bromon G50T and Bromon G163T, Montreal Stapler, Inc., Montreal, Quebec, Canada. Nails were driven into a variety of commodity woods.

EXAMPLE 2

Nail Packs Made From Polyphenylene Sulfide

This example describes nails made from a polyphenylene sulfide (PPS), in particular, Fortron® 1140L4, made by Hoechst Celanese (Chatham, N.J. 07928). PPS may also be obtained from General Electric, Co. (Supec®) and Phillips 66 Co. (Ryton®). Polyphenylene sulfide is a semicrystalline material that offers an excellent balance of high-temperature resistance, chemical resistance, flowability, dimensional stability, and electrical properties. The material can be filled with reinforcement fibers and fillers for injection molding. PPS is prepared from 1,4-dichlorobenzene and sodium sulfide in a polar solvent.

Because of its low melt viscosity, PPS can be loaded as high as 70% with a variety of fillers and reinforcements. The different compound loadings vary the strength, electrical properties, surface properties, dimensional stability, and cost of the compound. With a melt temperature of around 545° F., PPS can withstand short-term end use temperatures to 500° F. PPS typically has heat deflection temperatures (using load of 264 psi) of over 500° F. PPS is inherently flame-resistant because of its chemical structure of 70% aromatic compounds and 30% sulfur. Parts made from a PPS compound can withstand an aggressive chemical environment: no solvents below 400° F. are known to dissolve it.

PPS injection molding is done using a conventional screw injection molding machine with the heater zone temperatures in the range of 600° to 680° F. Precise mold temperature control is essential to obtain high heat dimensional stability for PPS. A measured mold temperature between 275° and 325° F. is sufficient for the material to crystallize.

The polyphenylene sulfide composition was dried overnight at 140° F. in a vacuum oven and fed into a reciprocating screw injection molder at barrel temperatures above the melt of the composition (580°– 620° F. ). The composition was plasticated and injected into a hot cavity (about 275°– 300° F. ) for optimum part properties. Cycle times were about 45 seconds. The present inventors have done the molding of this compound. The nails made from polyphenylene sulfide have an L/d ratio of 25, a bending or flexural modulus of $1.7 \times 10^6$ psi (measured), notched Izod impact strength of 1.5 ft-lb/in (manuf. literature) and compressive strength of 20,300 psi (measured). Results of maximum stress to fail tests are presented in FIG. 4.

A nail pack made from the polyphenylene sulfide composition of this example was inserted into a standard nailer: Spotnail HLB1516P (Spotnail, Inc., Rolling Meadows, Ill. 60008), and nails were driven into a variety of commodity woods. Polyphenylene sulfide nails have a greater flexural modulus than prior art nails, but Amodel® PPA nails are most preferred because of the high flexural modulus and compression strength of the fiber-filled polyphthalamide.

EXAMPLE 3

Nail Packs Made From Other Ultra-High Strength Composite Thermoplastics

Other ultra-high strength composite thermoplastic materials are expected to work according to the present invention. Polyetherimide such as Ultem® 2400 made by General Electric Co. having a flexural modulus of $1.7 - 2.5 \times 10^6$ psi and compressive strength of 20,000–31,000 psi is such a material. Polyetherimide is an amorphous high-performance thermoplastic that was introduced in 1982 by GE Plastics under the Ultem trademark. The material is characterized by high strength and rigidity at elevated temperatures, long-term heat resistance, in addition to highly stable dimensional and electrical properties, combined with broad chemical resistance and processability.

Polyetherimide has a chemical structure based on repeating aromatic imide and ether units. High-performance strength characteristics at elevated temperatures are supplied by rigid imide units, while the ether provides the chain flexibility for good melt processability and flow. Polyetherimide is readily processed on most conventional thermoplastic equipment. The resin must be dried thoroughly before melt processing. Melt temperatures of 660° to 800° F. and mold temperatures of 150° to 350° F. are used for injection molding.

Polyamide-imide, such as Torlon® 7130 made by Amoco Performance Products having a flexural modulus of $2.9 \times 10^6$ psi and compressive strength of 37,000 psi is another such material. Thermoplastic polyamide-imides are amorphous, high-temperature engineering thermoplastics, produced primarily by the condensation of trimellitic anhydride and various aromatic diamines. Polyamide-imide is available in unfilled, glass fiber-reinforced, and graphite fiber-reinforced grades. The unfilled grade has the highest impact resistance, while the graphite fiber-reinforced grade has the highest modulus or stiffness.

EXAMPLE 4

Penetration And Stress To Fail Tests

The analysis presented in this example demonstrates that prior art nails are inferior to nails of the present invention primarily due to the lower strength of the materials used in prior art nails which limits both the hardness of materials (such as wood) that prior art nails can penetrate, and the slenderness ratio that can be achieved with prior art nails.

Polymers were obtained as follows: Vectra® A130 (liquid crystalline polyester) (LCP) was from Hoechst Celanese, Chatham, N.J. 07928. Another manufacturer of LCP is Amoco Performance Products, Inc. (Xydar®). Lexan® 3412 (polycarbonate) (PC) was from General Electric Co., Pittsfield, Mass. 01201. Other manufacturers of PC are Dow (Calibre®), Mitsubishi Chemical (Novarex®), and Mobay, (Makroion®). RX1-4090 (acrylonitrile butadiene styrene) (ABS) was from The Resin Exchange, Cape Girardeau, Mo. 63701. Other manufacturers of ABS are Dow (Magnum®), General Electric Co. (Cycolac®), and Monsanto (Lustran®). Zytel® ST-801 (nylon) was from E.I. Du Pont, Wilmington, Del. 19898. Celanese® 6423, 7423, 7523 (nylon) were from Hoechst Celanese, Chatham, N.J. 07928. Other manufacturers of nylon are Allied Signal (Capron®, Capran®), BASF (Ultramid®), Du Pont ( Zytel®), and Monsanto (Vydyne®).

Composite materials (reinforced thermoplastic materials) were formed by injection molding into identical nail shapes having a L/d ratio of about 25.5±0.5. Nails were inserted into an industry standard tool (Spotnail) designed for 15 gauge metal finish nails and tested for penetration into three wood types of increasing hardness. The results are presented in Table 1.

TABLE 1

| PENETRATION TEST OF NAILS HAVING VARIOUS COMPOSITIONS[1] | | | |
|---|---|---|---|
| | (softest) WHITE PINE | YELLOW PINE | (hardest) OAK |
| Lexan ® 3412 polycarbonate | no | — | — |
| Zytel ® ST-801 nylon | — | no | no |
| Celanese ® 6423 nylon | no | no | no |
| Celanese ® 7423 nylon | no | no | no |
| Celanese ® 7523 nylon | partial | partial | no |
| RX1-4090 ABS | no | no | no |
| Vectra ® A130 LCP | yes | yes | no |
| Fortron ® 1140L4 PPS (EX. 2) | yes | yes | partial |
| Amodel ® A1133HS PPA (EX. 1) | yes | yes | yes |
| Amodel ® A1145HS PPA (EX. 1) | yes | yes | yes |

[1]The nails were made to a L/d ratio of about 25.5 ± 0.5.
no = no penetration; yes = complete penetration; partial = partial penetration; — = not tested Nails formed from polycarbonate, nylon, ABS or liquid crystalline polymer did not perform to the level of nails of the present invention formed from polyphenylene sulfide (PPS) or polyphthalamide (PPA).

The flexural modulus and compression strength of these nails were measured and the data are presented in Table 2.

TABLE 2

STRENGTH TEST OF NAILS HAVING VARIOUS COMPOSITIONS

| SAMPLE | FLEXURAL MODULUS (psi) measured | COMPRESSION STRENGTH (psi) measured |
|---|---|---|
| Lexan ® 3412 | $7.7 \times 10^5$ | $1.47 \times 10^4$ |
| Celanese ® 7523 | $7.17 \times 10^5$ | $1.46 \times 10^4$ |
| Vectra ® A130 | $2.20 \times 10^6$ | $1.28 \times 10^4$ |
| Fortron ® 1140L4 PPS (EX. 2) | $1.68 \times 10^6$ | $2.03 \times 10^4$ |
| Amodel ® A1133HS PPA (EX. 1) | $1.36 \times 10^6$ | $3.22 \times 10^4$ |
| Amodel ® A1145HS PPA (EX. 1) | $1.92 \times 10^6$ | $3.47 \times 10^4$ |
| Kotowa T-nail | $5.65 \times 10^5$ | $1.5 \times 10^4$ |
| Kotowa Finish | $1.15 \times 10^6$ | $2.07 \times 10^4$ |

Analysis of the maximum stress before failure for ideal columns was performed and is shown for these materials in FIG. 4. The horizontal portion of the curve represents compressive strength and the curved portion of the graph represents Euler bending stress data.

Flexural modulus and compressive strength are independent of L/d ratio. The flexural modulus from these tests is listed in Table 2 and is reflected in the Euler bending stress plotted as the curved part of the graph in FIG. 4. The commercially available Kotowa nails have a flexural modulus of $1.15 \times 10^6$ and $5.65 \times 10^5$, lower than that of nails of the present invention, which have, for example, a flexural modulus of $1.36$–$1.92 \times 10^6$ psi.

Nails made from PPA (Amodel® A1145HS) show a higher maximum stress to fail than any other nail up to an L/d ratio of about 38. The Amodel® A1133HS is superior to prior art nails up an L/d ratio of about 33. The PPS nail of Example 2 (Fortron 1140L4) is superior to prior art nails from an L/d ratio of about 24 to about 36.

Compressive strength is also listed in Table 2 and is represented as the horizontal portion of the graph of FIG. 4. The Kotowa nails have compressive strengths of $1.5$–$2.07 \times 10^4$ psi whereas PPA nails have compressive strengths of $3.22 \times 10^4$–$3.47 \times 10^4$ psi. The PPS nail is superior to the Kotowa nail above an L/d ratio of about 24. The PPS nail (Fortron) does not reach the pure buckling regime until an L/d ratio of about 29 is reached. For comparison, the maximum stress to fail for metal nails is about 230,000 psi for an L/d ratio of about 30 and 125,000 psi for an L/d ratio of about 40.

The performance of nails demonstrating penetration (Table 1) is ranked from highest penetration (1) to lowest (5) as shown in Table 3. The Amodel®, Fortron®, Vectra® and Celanese® nails had an L/d ratio of about 25.5, the Kotowa Finish nail, 14.0 and the Kotowa T-nail, 11.5.

TABLE 3

CORRELATION OF PENETRATION AND STRESS TO FAIL FOR NAILS OF TABLES 1 AND 2

| MATERIAL | PENETRATION RANKING | STRESS TO FAIL |
|---|---|---|
| Amodel ® A1145HS | 1 | 32,000 psi |
| Amodel ® A1133HS | 2 | 23,400 psi |
| Fortron ® 1140L4 | 3 | 20,300 psi |
| Vectra ® A130 | 4 | 12,900 psi |
| Celanese ® 7523 | 5 | 11,500 psi |
| Kotowa Finish Nail | — | 19,000 psi |
| Kotowa T-Nail | — | 9,200 psi |

The values correlate with the penetration information. Nail materials of the present invention have a compression strength above about 20,000 psi and a flexural modulus greater than about $1.2 \times 10^6$ psi.

EXAMPLE 5

Tensil And Shear Tests

Nails of the present invention and galvanized nails of the same size were partially inserted into white pine for tensile measurements. The 2" nails were inserted through the 1" wood leaving about ¼" of the nail head end protruding out for gripping by the tensile apparatus. Shear measurements were taken on joints formed with nails of the present invention and galvanized nails of the same size. In both tensile and shear, the galvanized nails failed by the nail being removed from the wood and the composite nails failed by fracture of the nail material. Tensile values for nails of this invention are higher than tensile values for galvanized nails, but shear values for nails of this invention are lower than values for galvanized nails. At least 5 measurements for each test and sample were taken.

TABLE 4

TENSILE AND SHEAR TESTS

| | AVG TENSILE FORCE TO FAILURE | AVG SHEAR FORCE TO FAILURE |
|---|---|---|
| Galvanized steel nails | 48 lbs.* | 91 lbs. |
| Amodel ® A1133HS | 55 lbs. | 48 lbs. |
| Fortron ® 1140L4 | — | 31 lbs. |

*To obtain the tensile or shear strength, divide the force by the cross sectional area of the nails (0.005 in²).

The tensile force to break Kotowa nails is reported at 9–13 lbs. (Kowa T Nail, manufacturer brochure) and the tensile force to pull out metal nails is reported at 2–3 lbs (McCafferty, P., Popular Science, April, 1987. pp. 66–67). These numbers are not comparable to the above cited force values because: 1) the cross sectional areas are not equal, 2) the surface of the metal is not known (coated, galvanized, uncoated), and 3) the length of penetration is not known for the Kotowa data.

EXAMPLE 6

Nail Packs Made From Thermoset Materials

The present inventors propose forming a nail pack from a thermoset material by several different, but standard methods of forming thermosets. Four of these methods are molding methods, the fifth is a method specific to thermosets called pultrusion. Common thermoset materials include phenolics, urea formaldehydes, melamine formaldehydes, furan resins, polyesters, epoxies, polyurethanes, polyisocyanurates, polyamides, and poly benzimidazoles. Common reinforcement materials include glass fiber, beads, other silica based fillers, asbestos, polymeric fibers, metal fibers, mineral filters, boron fibers, and synthetic organic fibers.

Molding consists of placing a measured charge of material into a heated mold, holding it in the mold until cured and ejecting the part. It is analogous to thermoplastic injection molding with the following differences: i) the resin is liquified at fairly low temperatures compared to a thermoplastic melt at high temperatures; and ii) the mold is kept hot to initiate the cure of the thermoset while with thermoplastics, the mold is kept at a temperature cool enough to solidify the melt. The liquefying temperature, curing temperature and curing time of the resin will be specific to the thermosetting material used.

Method 1: Transfer Molding. The thermosetting molding material (sometimes called bulk molding compound, BMC) is heated and liquified in a chamber pot outside the molding cavity and then transferred into the closed, hot mold cavity with sufficient pressure to fill the cavity and produce a dense, uniform part. Transfer of the material to the mold cavity is accomplished by a plunger that is actuated by the platen press that holds the mold closed or by an auxiliary ram. In the latter case, the clamping force of the platen press must be 20–25% above the total force of the resin in the cavities, sprues and runners under full auxiliary pressure. The material can be preheated and plasticized in a screw chamber and then dropped into the pot to reduce cycle time and automate operations. This is called screw transfer molding.

Method 2: Screw Injection Molding of Thermosets (Direct Screw Transfer). This method is the most similar to thermoplastic injection molding. The thermosetting material in granular or pellet form is fed from the hopper into the barrel and is then moved forward by the rotation of the screw, becoming plasticized or fluid by the conductive and frictional heat. The screw stops turning when the exact amount of material for a charge is accumulated. The screw then moves forward like a plunger by hydraulic pressure analogous to thermoplastic injection molding and forces the charge into the closed mold. The hot mold causes the material to set up or cure before the mold opens and the part is ejected. The screw for thermosets has a compression ratio of zero to prevent premature crosslinking of the resin. The screw compression ratio for thermoplastics is between 1 and 5 to help facilitate melting and plasticizing the material.

Method 3: Reaction Injection Molding. Two low molecular weight, low viscosity liquids that are highly reactive with each other are contained in two storage tanks. One or both may contain a reinforcing filler material. A specific amount of each liquid is metered out and injected by high pressure pumps into a mixing head where the two liquids impinge and mix thoroughly before being transferred to the mold cavity. The thermosetting reaction begins in the mixing head as the two liquids meet, and final cure occurs in the mold before the part is ejected. Mold temperature can be cold, but a higher temperature would speed up the crosslinking reaction. The reinforcement filler may also be placed in the mold before injection. In this case, the mixed liquids would flow around and saturate the filler during injection.

Method 4: Prepreg Molding. Layers of oriented fibers are pre-impregnated with a thermosetting resin and cured to an intermediate stage of polymerization known as B-stage preimpregnated composite precursor or prepreg. These materials may be purchased in this form. The prepreg can be laid up (usually by hand) in the mold for quick conversion into a final product through application of heat which causes the final crosslinking of the material to occur and pressure which causes the material to take the shape of the mold cavity. Precise control of the ply of the prepreg provides optimal strength and stiffness of the reinforced polymer composite.

Method 5: Pultrusion. Continuous strands in the form of roving or other forms of reinforcement are drawn through a liquid resin bath in which the strands are impregnated with the thermosetting resin material. The strand is then pulled through a long heated steel die which shapes the cross-section of the product and controls the resin content. Post processing of the pultruded B-stage "wire" follows similar methods to manufacture of metal nails out of metal wire: a flat bundle of "wires" is cut to a specified length, the points are cut and the nails are headed. The final cure occurs as the stock is passed through an oven. Finally, the flat bundle is cohered by tape, glue or a plastic strip.

The references cited herein are incorporated in pertinent part by reference for the reasons cited above.

It is understood that the examples and embodiments described herein are for illustrative purposes only and that various modifications in light thereof will be suggested to persons skilled in the art and are to be included within the spirit and purview of this application and scope of the appended claims.

What is claimed is:

1. A plastic nail pack mountable in an automatic nailer and comprising nails made from a plastic composite having a compression strength greater than about 20,000 psi and a flexural modulus greater than about $1.2 \times 10^6$ psi wherein nails from said nail pack, when having a L/d ratio of about 25.5±0.5 and driven by an industry standard tool designed for 15 gauge metal finish nails, completely penetrate white pine and yellow pine and at least partially penetrate oak.

2. The nail pack of claim 1 wherein each nail has an L/d ratio up to about 24.

3. The nail pack of claim 1 wherein each nail has an L/d ratio from about 24 to about 38.

4. The nail pack of claim 1 wherein the plastic composite has a compression strength greater than about 25,000 psi and a flexural modulus greater than about $1.6 \times 10^6$ psi.

5. The nail pack of claim 1 wherein the plastic composite has a compression strength greater than about 30,000 psi and a flexural modulus greater than about $1.9 \times 10^6$ psi.

6. The nail pack of claim 1 wherein each nail has a width of about 1/16 inch and a length greater than 1 inch.

7. The nail pack of claim 1 wherein each nail is driveable through a commodity wood by an automatic nailer without deformation or breakage.

8. The nail pack of claim 7 wherein the commodity wood is pine, chip board, oak, maple, cedar, redwood or cherry.

9. The nail pack of claim 1 wherein the plastic composite comprises a thermoset material.

10. The nail pack of claim 9 wherein the composite thermoset material is a reinforced phenolic compound, urea or melamine formaldehyde, furan resin, polyester, epoxy, polyurethane, polyisocyanurate, polyimide or polybenzimidazole.

11. The nail pack of claim 1 wherein the plastic composite comprises a thermoplastic material.

12. The nail pack of claim 11 wherein the composite thermoplastic material is fiber-filled polyphthalamide, polyphenylene sulfide, polyetherimide, or polyamide-imide.

13. The nail pack of claim 11 wherein the composite thermoplastic material is fiber-filled polyphthalamide.

14. The nail pack of claim 11 wherein the thermoplastic material is polyphenylene sulfide.

15. The nail pack of claim 11 wherein the thermoplastic material is polyetherimide or polyamide-imide.

16. The nail pack of claim 13 wherein the fiber-filled polyphthalamide comprises at least two recurring units selected from the group consisting of terephthalamide units, isophthalamide units and adipamide units.

17. The nail pack of claim 13 wherein the fiber-filled polyphthalamide comprises about 10 to about 200 parts by weight reinforcing fibers per hundred parts by weight of polyphthalamide component.

18. The nail pack of claim 17 wherein the reinforcing fibers are glass, graphite, boron, ceramic or aramid fibers.

19. The nail pack of claim 17 wherein the reinforcing fibers are glass fibers.

20. A plastic nail pack mountable in an automatic nailer and comprising fiber-filled polyphthalamide nails, the fiber-filled polyphthalamide having a compression strength greater than about 20,000 psi and a flexural modulus greater than about $1.2 \times 10^6$ psi.

21. The nail pack of claim 20 wherein each nail is driveable through a commodity wood by an automatic nailer without deformation or breakage.

22. The nail pack of claim 20 wherein each nail has a diameter of about 1/16 inch and a length greater than 1 inch.

23. A plastic nail pack mountable in an automatic nailer and comprising polyphenylene sulfide composite nails, each nail having an L/d ratio from about 24 to about 36, and the polyphenylene sulfide composite having a compression strength greater than about 20,000 psi and a flexural modulus greater than about $1.2 \times 10^6$ psi.

24. The nail pack of claim 23 wherein each nail is driveable through a commodity wood by an automatic nailer without deformation or breakage.

25. The nail pack of claim 23 wherein each nail has a diameter of about 1/16 inch and a length greater than 1 inch.

26. A plastic nail pack mountable in an automatic nailer made by a process comprising the steps of:

selecting a plastic composite having a compression strength greater than 20,000 psi and a flexural modulus greater than about $1.2 \times 10^6$ psi; and molding the plastic composite into a continuous pack wherein nails from said nail pack, when having a L/d ratio of about 25.5±0.5 and driven by an industry standard tool designed for 15 gauge metal finish nails, completely penetrate white pine and yellow pine and at least partially penetrate oak.

27. A method of making a plastic nail pack mountable in an automatic nailer comprising the steps of:

selecting a plastic composite having a compression strength greater than about 20,000 psi and a flexural modulus greater than about $1.2 \times 10^6$ psi; and molding the plastic composite into a nail pack wherein nails from said nail pack, when having a L/d ratio of about 25.5±0.5 and driven by an industry standard tool designed for 15 gauge metal finish nails, completely penetrate white pine and yellow pine and at least partially penetrate oak.

28. A nail formed of a plastic composite having a compression strength greater than about 20,000 psi and a flexural modulus greater than about $1.2 \times 10^6$ psi wherein said nail, when having a L/d ratio of about 25.5±0.5 and driven by an industry standard tool designed for 15 gauge metal finish nails, completely penetrates white pine and yellow pine and at least partially penetrate oak.

29. The nail of claim 28 wherein the plastic composite, is a composite thermoplastic or thermoset material.

30. The nail of claim 29 wherein the thermoplastic material is a fiber-filled polyphthalamide material.

31. A method of attaching nail penetrable construction materials, the method comprising the steps of:

obtaining nail penetrable construction materials;

mounting a nail pack in an automatic nailer, the nail pack comprising nails made from a plastic composite, having a compression strength greater than about 20,000 psi and a flexural modulus greater than about $1.2 \times 10^6$ psi; and driving a nail from the pack through the materials to be attached wherein nails from said nail pack, when having a L/d ratio of about 25.5×0.5 and driven by an industry standard tool designed for 15 gauge metal finish nails, completely penetrate white pine and yellow pine and at least partially penetrate oak.

32. The method of claim 31 wherein the nail penetrable construction material is a commodity wood or plaster board.

33. The method of claim 31 wherein the plastic composite is a thermoplastic material.

34. The method of claim 33 wherein the thermoplastic material is a fiber-filled polyphthalamide material.

35. A plastic nail pack mountable in an automatic nailer comprising nails having an L/d ratio of less than about 38, the nails made from a plastic composite having a compression strength greater than about 20,000 psi and a flexural modulus greater than about $1.2 \times 10^6$ psi wherein nails from said nail pack, when having a L/d ratio of about 25.5±0.5 and driven by an industry standard tool designed for 15 gauge metal finish nails, completely penetrate white pine and yellow pine and at least partially penetrate oak.

36. The nail pack of claim 35 wherein the nails have an L/d ratio of between about 10 and about 25.

37. The nail pack of claim 35 wherein the nails have an L/d ratio of between about 10 and about 30.

38. The nail pack of claim 35 wherein the nails have an L/d ratio more than 10.

39. The nail pack of claim 38, wherein the flexural modulus is greater than about $1.6 \times 10^6$ psi.

40. The nail pack of claim 38, wherein the flexural modulus is greater than about $1.9 \times 10^6$ psi.

41. The nail pack of claim 38, wherein the compression strength is greater than about 25,000 psi.

42. The nail pack of claim 38, wherein the compression strength is greater than about 30,000 psi.

* * * * *

UNITED STATES PATENT AND TRADEMARK OFFICE
CERTIFICATE OF CORRECTION

PATENT NO. : 5,547,325

DATED : August 20, 1996

INVENTOR(S) : Pamela S. Tucker and Nancy Showers

It is certified that error appears in the above-indentified patent and that said Letters Patent is hereby corrected as shown below:

On the title page, item [54] and column 1, line 3, delete "Modules" and insert --Modulus-- therefor.

In claim 29, column 16, line 16, delete the punctuation mark "," after the word "composite"

Signed and Sealed this

Twenty-ninth Day of October 1996

Attest:

BRUCE LEHMAN

Attesting Officer

Commissioner of Patents and Trademarks